Aug. 10, 1954
C. L. RICARDS
2,685,802
VARIABLE DRIVE MECHANISM
Filed June 27, 1950
4 Sheets-Sheet 1
Fig.1,
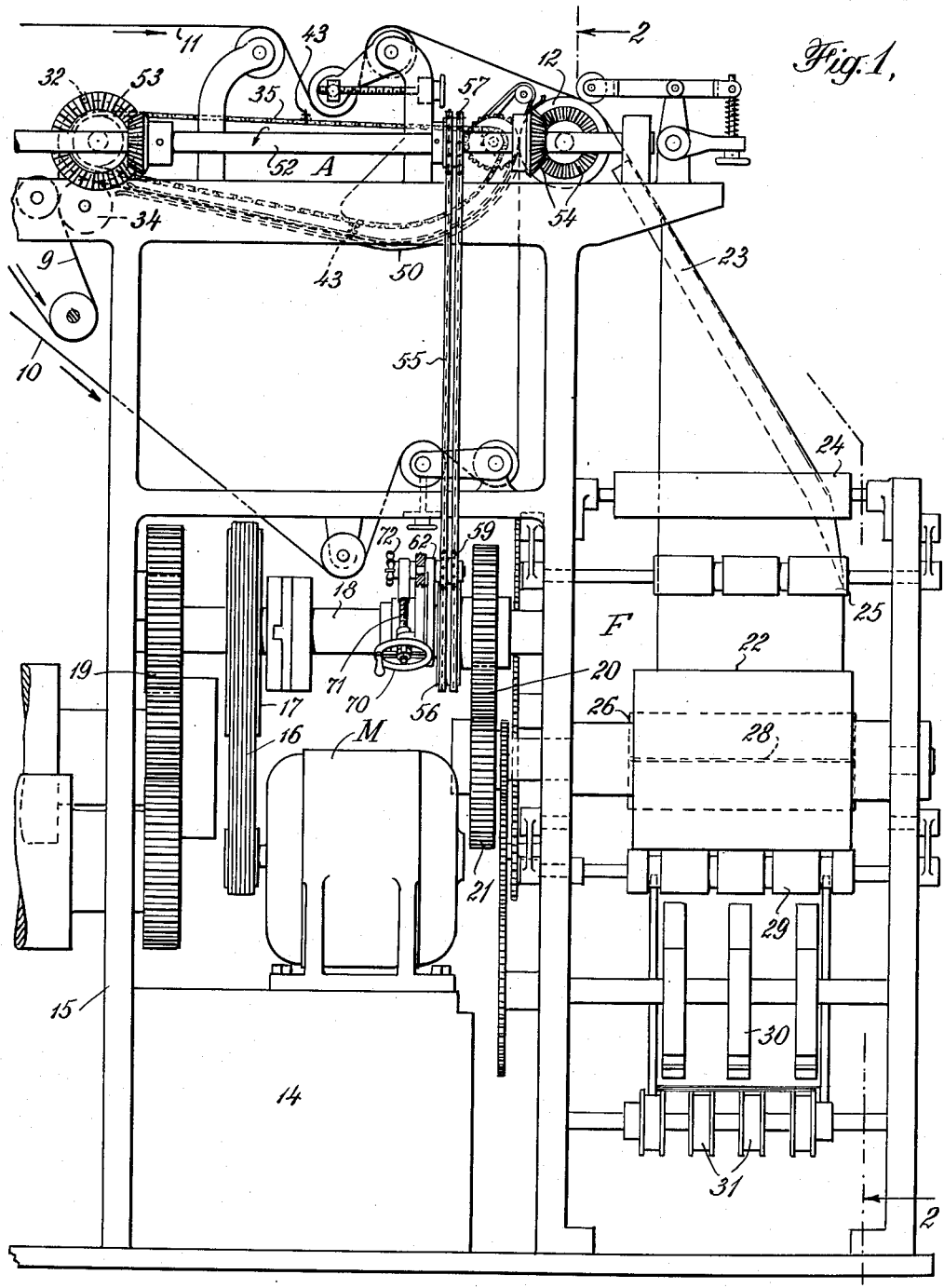
INVENTOR
CHARLES L. RICARDS
BY
Pennie, Edmonds, Morton & Barrows
ATTORNEYS

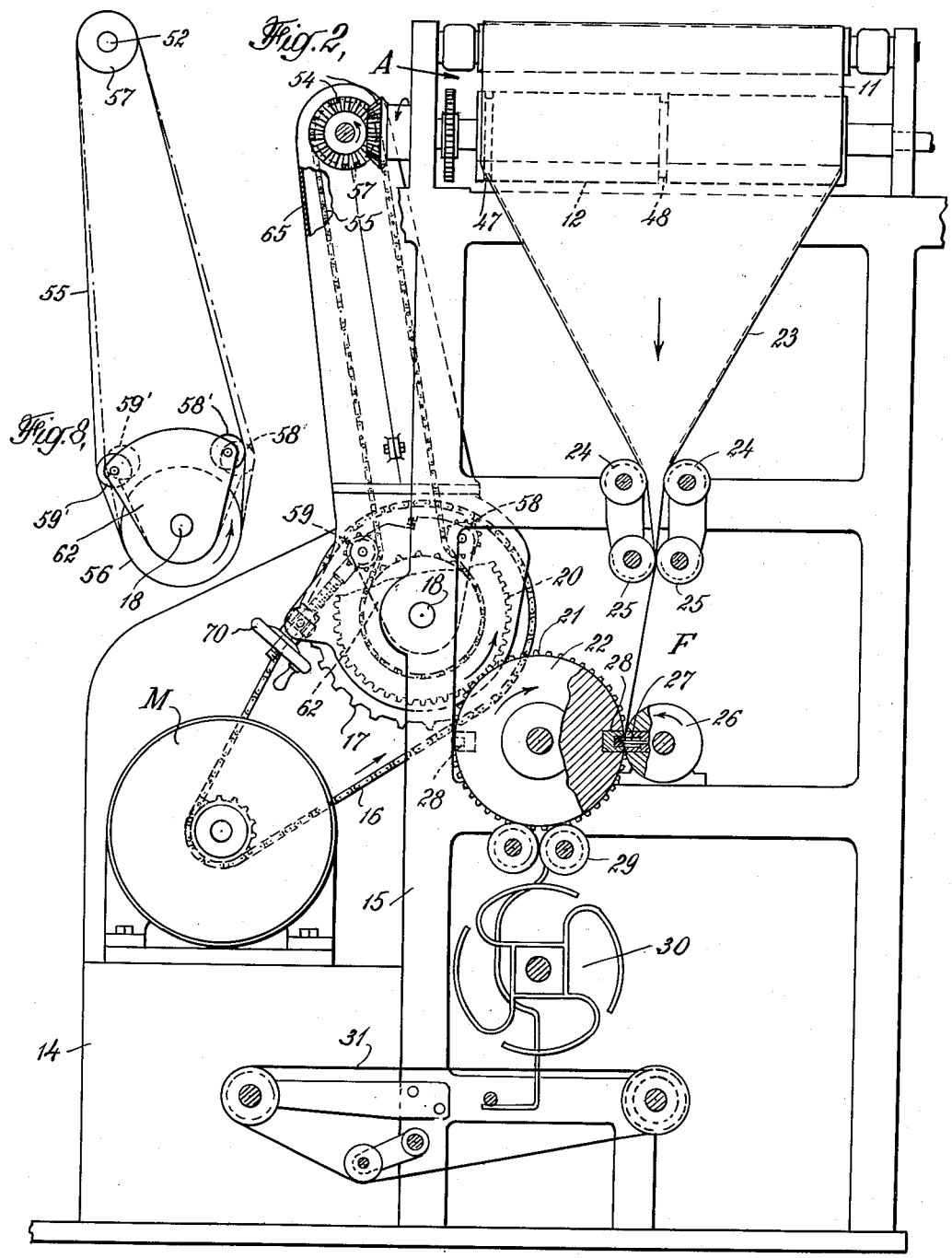

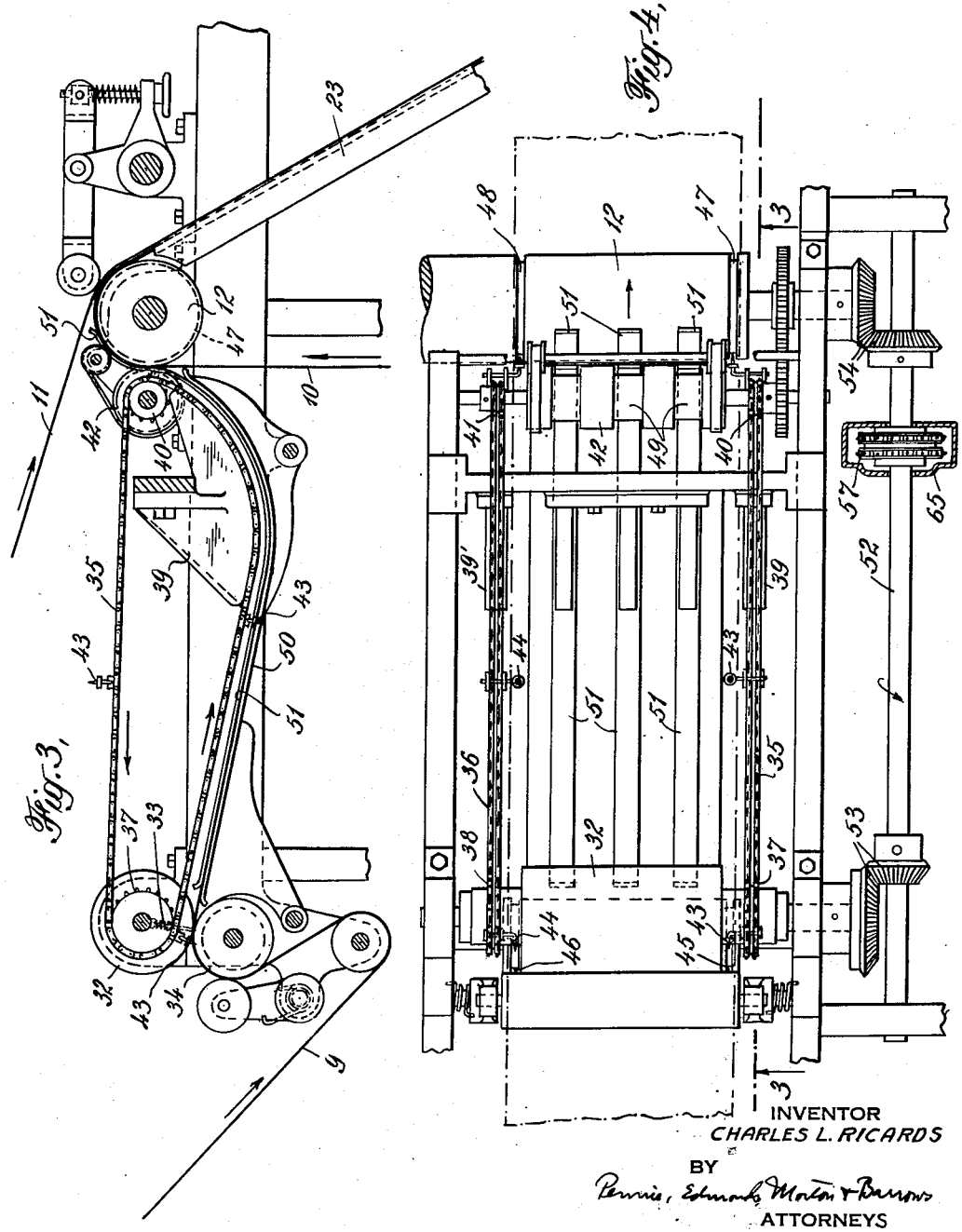

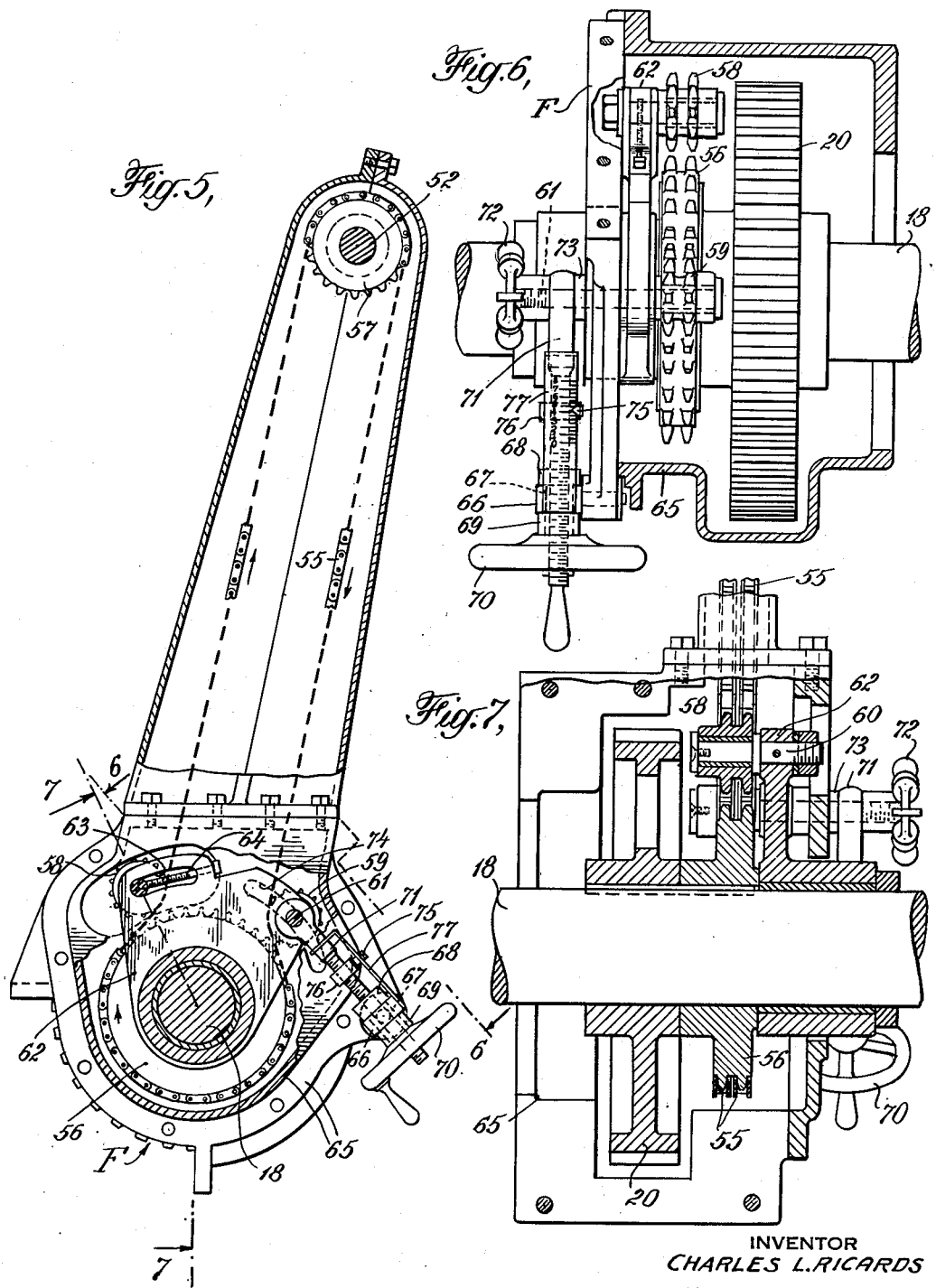

Patented Aug. 10, 1954

2,685,802

UNITED STATES PATENT OFFICE 2,685,802

VARIABLE DRIVE MECHANISM

Charles L. Ricards, South Plainfield, N. J., assignor to Wood Newspaper Machinery Corporation, Plainfield, N. J., a corporation of Virginia Application June 27, 1950, Serial No. 170,621

1 Claim. (Cl. 74—242.1)

This invention relates to driving mechanism and more particularly concerns a drive for connecting two rotary elements which incorporates means for variably adjusting the relative timing of the two connected elements while the drive is in operation. The improved drive is capable of general application and may be used to advantage in certain printing presses to adjust the relation in time between a mechanism that cuts sheets from a web and consolidates them with one or more uncut webs and a mechanism that cuts the consolidated webs and sheets into separate paper products or sections.

In mechanical drives, it is sometimes necessary or advisable to provide mechanism capable of altering the relative timing of two rotary driven elements while they are rotating, that is, to advance or retard the relative orbital positions of the two elements with respect to each other. In the past, differential gearing has been employed for this purpose. Differential gearing is complicated and expensive, involving the use of a multiplicity of precision cut gears and requiring considerable maintenance and lubrication.

It is the object of the present invention to provide a simple and inexpensive drive mechanism for forming a driving connection between two rotary shafts or other rotary elements which is capable of providing variable adjustment of the relative positional timing of the two elements while they are rotating and this without the use of the mechanism commonly termed differential gearing or any gearing whatsoever. A further object of the invention is to provide a combination comprising two web handling mechanisms, the first of which cuts sheets from one web and consolidates them with a web or webs subsequently cut into products by the second web cutting mechanism, and a variably adjustable drive of the type described forming a driving connection between the two web handling mechanisms whereby the timed relation of these mechanisms can be adjusted so that the second mechanism cuts the webs precisely at the ends of the sheets cut and inserted by the first mechanism.

In general, the variably adjustable drive of the invention comprises an endless flexible driving element, such as a chain or belt, having a substantial amount of slack therein and connecting two rotary elements, together with idlers respectively engaging like sides of the flexible element, that is, the outside or the inside thereof, along its opposite spans, the idlers being mounted for movement in unison transversely of the spans during operation of the drive so as to transfer adjusted amounts of the slack in the flexible driving element between the two spans. This transfer of slack advances or retards one of the rotary elements with respect to the other and hence variably adjusts their relative timing.

In describing the invention in detail, reference will be made to the accompanying drawings in which an embodiment thereof has been illustrated in conjunction with the sheet inserting and folding mechanism of a rotary newspaper printing press.

In the drawings—

Fig. 1 is an end elevation of the driving mechanism, the folder and the sheet cutting and inserting mechanism of a press incorporating my variably adjustable drive, with the housing of the adjustable drive removed;

Fig. 2 is a side elevation of the mechanism shown in Fig. 1, taken along the line 2—2 of Fig. 1;

Fig. 3 is an enlarged elevation of the sheet cutting and inserting mechanism, taken on the line 3—3 of Fig. 4;

Fig. 4 is a plan view of the mechanism shown in Fig. 3;

Fig. 5 is an elevation on an enlarged scale of the variably adjustable drive of the invention;

Fig. 6 is an enlarged sectional view taken along the line 6—6 of Fig. 5, with the chain omitted;

Fig. 7 is an enlarged sectional view taken along the line 7—7 of Fig. 5; and

Fig. 8 is a diagrammatic representation of a modification of the variably adjustable drive.

Referring to the drawings and particularly to Figs. 1 and 2, the printing press, of which a portion is illustrated, is of a construction employing two or more printing couples, one of which can be operated at half the standard speed and so can deliver a web 9 moving at half of the normal web speed. The other printing couple or couples of the press print webs 10 and 11 that run at standard or full web speed. A web handling mechanism, hereinafter termed a sheet accelerator and generally indicated at A in Figs. 1 and 2, cuts successive sheets from the half-speed web 9, positively accelerates the cut sheets successively to full web speed, and consolidates them with the full speed web or webs 10 and 11 as they pass over the surface of a drag roller 12. The webs 10 and 11 with the spaced sheets thus inserted therebetween are then folded and cut into separate products or product sections on a folder F of known construction. A printing press of this construction is described in detail in Patent No. 2,385,659. In the operation of the mechanism generally described above, the relation in time between the operation of the sheet accelerator A in inserting cut sheets at spaced points between the full speed webs 10 and 11 and the cutting operation of the cutting couple of the folder F must be precisely adjusted in order that the positions of the edges of the inserted sheets may coincide with the points at which the cutting couple of the folder F severs the webs 10 and 11. If this timing relation is not properly adjusted, the ends of the inserted sheets cut from the half speed web 9 by the sheet accelerator A will not coincide with the ends of the product sections cut from the full speed webs 10 and 11 by the cutting couple of the folder F, with the result that narrow strips of web will be cut from one end of each inserted sheet and the other end thereof will fall short of the end of the product section cut from the full speed webs. By employing as a driving connection between the folder F and the sheet accelerator A my improved variably adjustable drive, the required adjustment in relative timing can be made while the press and its sheet accelerator and folder are in operation.

Referring to the illustrated mechanism, and particularly to Figs. 1 and 2, a press driving motor M is suitably mounted on a base 14 adjacent the press side frame 15 and is connected by a chain 16 to a sprocket 17 on the main drive shaft 18 of the press. It will be understood that the shaft 18 is connected through suitable gearing 19 to drive the impression cylinders, printing cylinders, and other mechanism constituting the printing couples of the press, which couples print the webs 9, 10 and 11. The main drive shaft 18 is also connected through the gears 20 and 21 to drive the folding cylinder 22 of the folder F.

The folder F is of conventional known construction and may, for example, be of the construction described in detail in Patent No. 1,848,591. As shown, the folder F comprises generally a former 23 over which the webs are centrally folded and from which they are led through the leading in rolls 24 and the nipping rolls 25 to the nip between the folding cylinder 22 and the cutting and collecting cylinder 26. The cutting cylinder carries a knife 27 that cooperates with the usual cutting rubbers 28 on the folding cylinder 22. It will be understood by those skilled in the art that the cut products or product sections are tucked between the folding rolls 29 by conventional folding blades on the folding cylinder 22 and are thus delivered to the pockets of the fan 30, which in turn deposits them on the delivery tapes 31.

The sheet accelerator A is employed to add one sheet or two pages to one of two product sections that are later combined by a "collect" operation of the folder F in a known manner. To this end, the sheet accelerator A here disclosed includes a cutting couple comprising a cutting cylinder 32 carrying a knife 33 and a cooperating backing up cylinder 34, endless chains 35 and 36 run over sprockets 37 and 38 carried on the shaft of the cutting cylinder 32, and these chains run over guides 39 and 39' and over sprockets 40 and 41 carried on the shaft of a stripping cylinder 42. The chains 35 and 36 carry sheet carrying pins 43 and 44 disposed opposite each other, the ends of which pins extend into grooves 45, 46, in the backing up cylinder and into grooves 47, 48 in the drag roller 12. A lower guide pan 50 supports the severed sheets carried by the pins 43 and 44 and extends to a point adjacent the nip between the stripping cylinder 42 and the drag roller 12. Upper guides 51 hold the sheets on the pan 50 and extend into grooves 49 in the stripping cylinder 42 and continue over the surface of the drag roller 12, as shown in Figs. 3 and 4. The sheet accelerator A is driven by a jack shaft 52 connected through the bevel gears 53 to the shaft of the cutting cylinder 32 and through the bevel gears 54 to the shaft of the drag roller 12. As the severed sheets are carried by the pins 43 and 44 over the curved path of decreasing radius defined by the guide means described, the sheets are in turn accelerated from half standard web speed to full standard web speed and are inserted between and consolidated with the full speed webs 10 and 11. The sheets cut from the half speed web 9 are thus inserted at equally spaced points along the full speed webs 10 and 11. With this arrangement, every second product section cut from the webs in the folder F has one sheet or two pages more than the intervening sections. The construction and operation of the sheet accelerator is described more in detail in the above-noted Patent No. 2,385,659 and another form of such mechanism is described in my copending application Serial No. 151,846, filed March 25, 1950, now abandoned, and entitled "Web Accelerating Apparatus."

Referring now more particularly to the variably adjustable drive of the invention, this drive is here illustrated as forming a driving connection between the folder F and the sheet accelerator A, and to this end is connected between the main drive shaft 18 that drives the folder F and the jack shaft 52 that drives the sheet accelerator A.

As best shown in Figs. 2, 5 and 6, the illustrated embodiment of my improved drive comprises an endless flexible driving element in the form of a double roller chain 55 engaging a sprocket 56 fixed to the main drive shaft 18 and a sprocket 57 fixed to the parallel jack shaft 52, there being a considerable amount of slack in the chain 55. Two idler sprockets 58 and 59 respectively engage like sides of the chain 55 along the opposite spans thereof. In the embodiment illustrated in Figs. 1, 2, 5, 6 and 7, these idlers 58 and 59 both engage the outside of the chain at substantially opposite points near the sprocket 56. As an alternative, the two idlers 58' and 59' could with like effect respectively engage the inside of the chain 55 along its opposite spans, as illustrated in Figure 8. The idlers 58 and 59 are rotatably carried by studs 60 and 61 fixed to spaced points on a sector plate 62 that is journalled on and movable about the main drive shaft 18.

The distance between the axes of the idlers 58 and 59 is such that they deflect the chain 55 along its opposite spans sufficiently to take up the slack in the chain. To permit adjustment of the distance between the idlers to compensate for wear, the stud 60 of the idler sprocket 58 is adjustably fixed in an arcuate slot 63 in the sector plate 62 and is adjustably movable along this slot by suitable means, such as a screw 64. The idler carrying sector plate is adjustably movable to move the idlers 58 and 59 in unison transversely of the spans of the chain 55, whereby the slack in the chain can be adjustably transferred between its two spans, with the result that the relative timing of the two shafts 18 and 52 is adjustably altered. A stationary housing 65 encloses the lower sprocket 59 and the idler carrying sector plate 62. A poppet 66 fixed to the housing 65 rotatably carries a sleeve 67 having a central threaded bore and having collars 68 and 69 thereon that respectively engage opposite faces of the poppet 66. A hand wheel 70 is fixed to the sleeve 67. A threaded eye-bolt 71 is secured to an extended end of the stud 61 of the idler sprocket 59 by means of a wing nut 72. The threaded shank of the eye-bolt 71 engages the threaded bore of the sleeve 67 so that rotation of the hand wheel 70 moves the sector plate 62 and thus moves the two idlers 58 and 59 in unison transversely of the spans of the chain 55. The wing nut 72 serves to clamp the sector plate 62 in its adjusted position by pressing a washer 73 against a face of the housing 65 adjacent an arcuate slot 74 therein through which the end of the stud 61 extends. A pointer 75 fixed by a nut 76 to the shank of the eye-bolt 71 rides along a scale plate 77 fixed to the poppet 66 and indicates the adjusted position of the idler sprockets 58 and 59 and so indicates the adjusted time relation between the drive connected shafts 18 and 52. The housing 65 preferably encloses the entire chain 55 and the upper sprocket 57 as well as the folder drive gear 20 on the shaft 18.

In operation, if the sheets fed by the sheet accelerator A are advanced too much with respect to the web or webs 10, 11, with which they are consolidated so that the leading ends of these sheets are again cut in the cutting couple of the folder F, then the operator moves the sector plate 62 counterclockwise, as viewed in Fig. 2, so as to increase the amount of slack in the span of the chain 55 that is engaged by the idler 58, and thus retard the timing of the sheet accelerator A with respect to the folder F. If the inserted sheets are retarded, so that their trailing ends are recut in the cutting couple of the folder F, this is corrected by moving the sector plate 62 clockwise, as viewed in Fig. 2, to transfer more slack to the span of the chain 55 that is engaged by the idler 59. When the idlers engage the inside of the chain spans, as illustrated in Fig. 8, the direction of movement of the idlers for a given adjustment is reversed. Thus the adjustment, which retards the timing of the sheet accelerator shaft 52 with respect to the folder drive shaft 18, is illustrated by the movement of the parts from the positions illustrated in the full lines to those illustrated in broken lines in Fig. 8. By the described adjustment, the relative timing of the sheet accelerator A which inserts the sheets cut from the half speed web and the cutting couple of the folder F that cuts the webs 10 and 11 with which the sheets are consolidated can be so regulated that the webs are cut in the folder precisely at the ends of the inserted sheets.

Although my improved adjustable drive has been described in connection with a particular application in which it connects the sheet accelerator and the folder of a printing press, it is to be understood that the invention in its broader aspects is not limited to this particular application of the drive.

I claim:

An adjustable drive comprising two parallel shafts carrying aligned sprockets, an endless chain engaging said sprockets and having a substantial amount of slack therein, a pair of idlers respectively engaging the outside of said chain along its opposite spans and adjacent one of said sprockets, an idler support journalled on the shaft of said one of said sprockets, means rotatably securing said respective idlers to spaced points on said support, means for variably adjusting the distance between said idlers, and means for adjustably turning said idler support about said shaft whereby said idlers are moved in unison transversely of the spans of said chain and slack is transferred between the spans of said chain.

References Cited in the file of this patent

UNITED STATES PATENTS

| Number | Name | Date |
|---|---|---|
| 1,107,382 | Tygard | Aug. 18, 1914 |
| 1,599,552 | Chisholm | Sept. 14, 1926 |
| 2,229,226 | Scott et al. | Jan. 21, 1941 |
| 2,352,797 | Miller | July 4, 1944 |
| 2,385,659 | Tornberg | Sept. 25, 1945 |
| 2,474,457 | Barth | June 28, 1949 |
| 2,600,284 | Tranter | June 10, 1952 |

FOREIGN PATENTS

| Number | Country | Date |
|---|---|---|
| 77,223 | Germany | Mar. 4, 1894 |
| 228,061 | Germany | Nov. 2, 1910 |